United States Patent
Itakura

(10) Patent No.: US 10,200,633 B2
(45) Date of Patent: *Feb. 5, 2019

(54) CAMERA SYSTEM, VIDEO SELECTION APPARATUS AND VIDEO SELECTION METHOD

(71) Applicant: Sony Corporation, Tokyo (JP)

(72) Inventor: Eisaburo Itakura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,319

(22) Filed: Apr. 3, 2017

(65) Prior Publication Data
US 2017/0208258 A1 Jul. 20, 2017

Related U.S. Application Data

(63) Continuation of application No. 15/097,366, filed on Apr. 13, 2016, now Pat. No. 9,641,771, which is a continuation of application No. 14/259,427, filed on Apr. 23, 2014, now Pat. No. 9,338,483, which is a
(Continued)

(30) Foreign Application Priority Data

Jun. 11, 2010 (JP) .................................. 2010-134111

(51) Int. Cl.
*H04N 21/236* (2011.01)
*H04N 5/268* (2006.01)
*H04N 21/44* (2011.01)
*H04N 5/232* (2006.01)
*H04N 5/247* (2006.01)

(52) U.S. Cl.
CPC ......... *H04N 5/268* (2013.01); *H04N 5/23203* (2013.01); *H04N 5/23206* (2013.01); *H04N 5/247* (2013.01); *H04N 21/236* (2013.01); *H04N 21/44* (2013.01)

(58) Field of Classification Search
CPC ...... H04N 21/236; H04N 5/268; H04N 5/247; H04N 5/23203; H04N 5/23206; H04N 21/44
See application file for complete search history.

(56) References Cited

U.S. PATENT DOCUMENTS 8,810,668 B2    8/2014  Itakura
9,338,483 B2    5/2016  Itakura
9,641,771 B2 *  5/2017  Itakura ................. H04N 21/236
(Continued)

FOREIGN PATENT DOCUMENTS

JP        2005-278323        11/2008

OTHER PUBLICATIONS

Office Action issued in corresponding Japanese Application No. 2010-134111 dated Aug. 26, 2014 and the English Translation.
(Continued)

*Primary Examiner* — Hunter B Lonsberry
(74) *Attorney, Agent, or Firm* — Haug Partners LLP; William S. Frommer

(57) ABSTRACT

A camera system includes a plurality of camera apparatuses that output respective video data in a packetized format. A relaying apparatus receives the packetized video data from the plurality of camera apparatuses and relays selected selected packetized video data from a particular one of the plurality of camera apparatuses on a frame basis.

12 Claims, 12 Drawing Sheets

Related U.S. Application Data continuation of application No. 13/154,003, filed on Jun. 6, 2011, now Pat. No. 8,810,668.

(56) References Cited

U.S. PATENT DOCUMENTS

| | | |
|---|---|---|
| 2007/0169151 A1 | 7/2007 | Vishloff et al. |
| 2007/0277219 A1* | 11/2007 | Toebes .................. H04N 7/163 |
| | | 725/139 |
| 2009/0060059 A1* | 3/2009 | Koyama ................ H04L 69/28 |
| | | 375/240.28 |

OTHER PUBLICATIONS

Office Action issued in corresponding Chinese Application No. 2011101583282 dated Apr. 3, 2015 and the English Translation.
Office Action issued in corresponding Japanese Application No. 2014-238950 dated Nov. 10, 2015.

* cited by examiner

FIG.5

| USED HEADER | ABBREVIATION | NAME | BIT LENGTH | CONTENT | DESIGNATION VALUE |
|---|---|---|---|---|---|
| RTP HEADER | V | Version | 2bit | VERSION NUMBER | 2 |
| | P | Padding | 1bit | PRESENCE OR ABSENCE OF PADDING BIT | 0 |
| | X | eXtension | 1bit | EXTENSION BIT | 0 |
| | CC | CSRC Count | 4bit | CONTRIBUTING SOURCE COUNT | 0 |
| | M | Marker | 1bit | MARKER BIT | |
| | PT | Payload Type | 7bit | PAYLOAD TYPE | |
| | Sequence Number | Sequence Number | 16bit | SEQUENCE NUMBER | |
| | Time Stamp | Time Stamp | 32bit | TIME STAMP | |
| | SSRC | SSRC | 32bit | TRANSMITTER IDENTIFIER | |

CAMERA SYSTEM, VIDEO SELECTION APPARATUS AND VIDEO SELECTION METHOD

This is a continuation of application Ser. No. 15/097,366, filed Apr. 13, 2016, which is a continuation of application Ser. No. 14/259,427, filed Apr. 23, 2014, now U.S. Pat. No. 9,338,483, issued May 10, 2016, which is a continuation of application Ser. No. 13/154,003, filed Jun. 6, 2011, now U.S. Pat. No. 8,810,668, filed Aug. 29, 2014, which is entitled to the priority filing date of Japanese application 2010-134111, filed Jun. 11, 2010, the entirety of which is incorporated herein by reference.

BACKGROUND OF THE INVENTION

1. Field of the Invention

The present disclosure relates to a camera system, a video selection apparatus, and a video selection method.

2. Description of the Related Art

In a camera system used in a broadcasting station and the like, a camera head unit (CHU) for outputting a video signal and a camera control unit (CCU) for receiving the video signal are connected to each other through a triaxial cable or an optical fiber cable (Japanese Patent Application Laid-Open Nos. 2005-057499 and 2005-064816).

SUMMARY OF THE DISCLOSURE

However, when the CHU is connected to the CCU through a triaxial cable or an optical fiber cable in a one-to-one manner, a video signal photographed by the CHU needs to be extracted from the CCU. Furthermore, a GEN-LOCK signal, a control signal, a return video signal and the like for the CHU need to be input from the CCU.

As a result, in a camera system used in a broadcasting station and the like, since a plurality of cables are connected to the CCU, time and effort are necessary for the connections thereof and the installation of the cables.

Furthermore, when the CHU and the like are added, exchanged or rearranged after one camera system is constructed built, much time and effort are necessary, for example, for changing the cable connection of the CCU.

In the camera system as described above, it is necessary to facilitate system modification and the like by reducing the number of cable connections to the CCU.

In this regard, a system having CCUs that are same in number as a plurality of cameras may be considered. However, in such a case, since all of N CCUs should have a decoding function, it is not possible to avoid an increase in the system cost. Furthermore, it is necessary to connect the CCUs to a video live switcher by wires corresponding to the number of the cameras. However, in a video source actually used in broadcasting, for example, when a video live switcher mixes two screens with each other, since it is sufficient for two input sources to be input, cable inputs corresponding to all the cameras are not necessary. Therefore, even in the system having CCUs that are same in number as a plurality of cameras, redundant parts may exist during system configuration.

In light of the foregoing, it is desirable to provide a novel and modified camera system, video selection apparatus, and video selection method, which can select a desired video from videos from a plurality of camera apparatuses and thus simplify system configuration.

One implementation of the camera system includes a plurality of camera apparatuses to output respective video signals in the form of packetized video data. A relay apparatus is coupled to the plurality of camera apparatuses to relay selected packetized video data received from the plurality of camera apparatuses. The relay apparatus includes a receiving unit to receive the packetized video data from the plurality of camera apparatuses and a control unit to determine selected packetized video data from a particular one of the plurality of camera apparatuses based on an input control signal. A switch unit selects and outputs the selected packetized video data on a frame basis.

According to the embodiments of the present disclosure described above, it is possible to select a desired video from videos from a plurality of camera apparatuses and simplify system configuration.

BRIEF DESCRIPTION OF THE DRAWINGS

FIG. 5 is a schematic diagram showing parameter information of the RTP format shown in FIG. 4.

DETAILED DESCRIPTION

Figure 1:
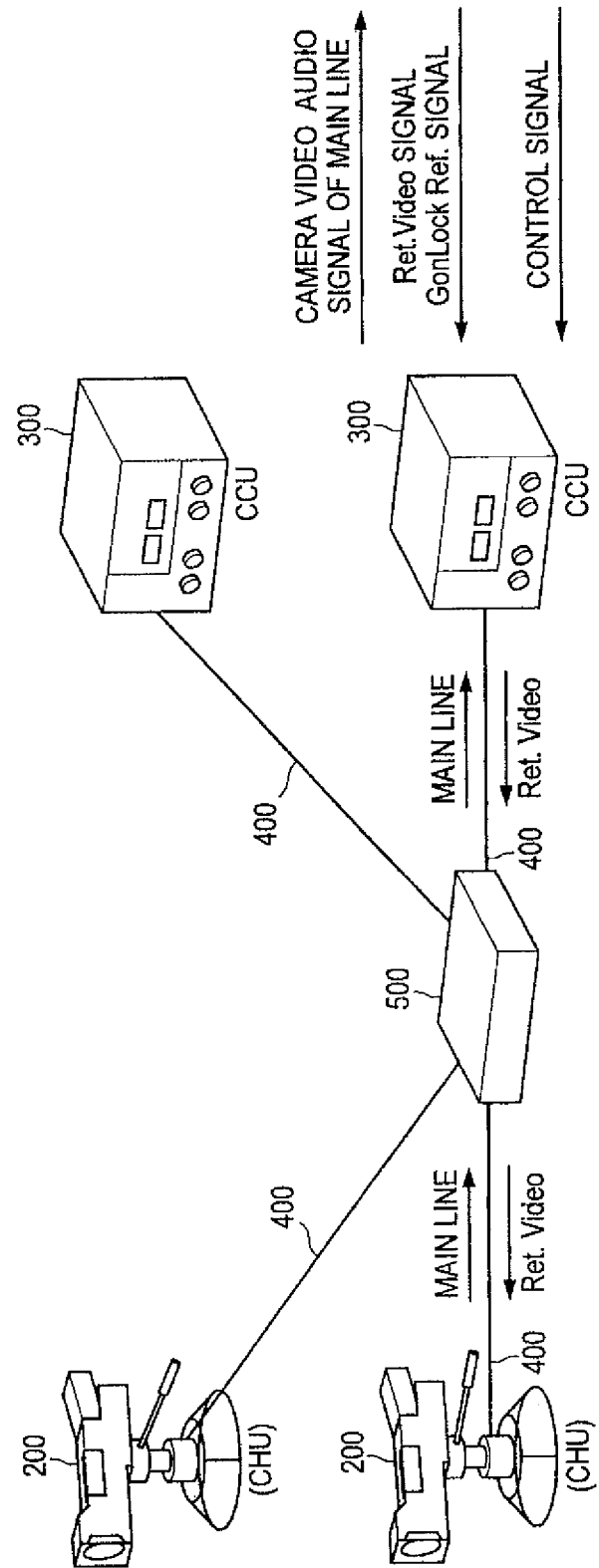
FIG. 1 is a schematic configuration diagram of a camera system according to each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be made in the following order,

1. First embodiment
   (1) Basic technology
   (2) System configuration example
   (3) Procedure of switch control
2. Second embodiment
   (1) System configuration example
3. Third embodiment
   (1) System configuration example

1. First Embodiment (1) Outline

In a camera control system according to the present embodiment, a camera video signal is packetized into an IP packet and transmitted using a cable such as Ethernet (registered trademark) through an IP network, and a camera control unit (CCU) receiving unit receives and decodes the IP packet to output a video signal. According to the present embodiment, the system has a function obtained by integrating an IP switching function of selecting a desired video from videos of a plurality of cameras with a selection/control/effect function of a camera video. In the conventional system, CCUs that are the same in number as a plurality of cameras is necessary and the number of wirings between the CCUs and a video switcher is large. In the system according to the present embodiment, only the maximum number of CCUs necessary for the output of a video switcher are provided. Furthermore, by integrating a control/selection function and further an effect function into an IP switch, a function equivalent to that of a video live switcher provided to the rear stage of the CCU can be achieved using a general purpose switch device and an Ethernet (registered trademark) interface. Furthermore, simplification of wiring using an IP, system modification including expansion and the like, and integration with other IP devices are facilitated.

FIG. 1 is a schematic configuration diagram of a camera system 100 according to each embodiment of the present disclosure. The camera system 100 shown in FIG. 1, for example, is used in a broadcasting station and the like and includes camera head units (CHUs) 200 and CCUs 300. The CHUs 200 and the CCUs 300 are connected to a relay apparatus 500 using twisted pair cables 400. The twisted pair cable 400 may be a cable conforming to the Institute of Electrical and Electronics Engineers (IEEE) 802.3 and the like.

The IEEE 802.3 is the standard for a data communication system using a packet, and packetizes communication data into a packet by a predetermined data amount and performs communication using the packet. Thus, in the camera system 100 shown in FIG. 1, the CHUs 200 and the CCUs 300 packetize a video signal, an audio signal, a control signal, a GEN-LOCK signal and the like into a packet and transmit the packet through an asynchronous transmission line. Then, in the camera system 100 shown in FIG. 1, the video signal which includes a photographed main line video signal, the audio signal, the control signal, the GEN-LOCK signal and the like may be extracted from the relay apparatus 500 in the middle of the CHUs 200 and the CCUs 300, or may be inserted thereto.

Furthermore, the relay apparatus 500 outputs the video signals, which have been transmitted from the CHUs 200, and return video signals, which have been transmitted from the CCUs 300, to the outside. These video signals, for example, can be recognized by monitor apparatuses connected to the CHUs 200, a monitor apparatus (not shown in FIG. 1) connected to the relay apparatus 500, and the like. As described above, in the camera system 100 shown in FIG. 1, a video relay system using the CHUs 200 can be simply configured, installed and operated at a low cost.

The relay apparatus 500 includes the configuration of a switching hub provided with a plurality of ports. The switching hub selects ports of output destinations based on destinations of packets input from each port and outputs the packets from the selected ports, respectively. Furthermore, when a broadcast address is used in a packet, it is possible for the switching hub to basically output a received packet from all ports.

In the conventional camera system, it is necessary to provide N CCUs 300 that are the same in number as a plurality of (N) cameras 200 and all outputs of the CCUs 300 are input to the video live switcher of a rear stage. Specifically, in a hi-vision (HD) video, a video codec mainly performs an encoding process due to band limitation and all of the N CCUs 300 should have a decoding function, resulting in an increase in the system cost.

Furthermore, in the conventional camera system as described above, it is necessary to connect the CCUs 300 to the video live switcher using N HD-SDI cables. However, in a video source actually used in broadcasting, for example, when the video live switcher mixes two screens with each other, since it is sufficient for two input sources to be input, N inputs are not necessary. Even for an effect process using a multi-source by a complicated switcher, it is sufficient for about four screens to be treated and redundant parts exist in the conventional system configuration. In this regard, when a minimum configuration is taken into consideration, for example, when a video is selected from a plurality of CCUs and broadcast using only switching without an effect, it is sufficient to have only one CCU.

Thus, if there are functions corresponding to the video live switcher or the CCUs 300 with the number for the effect process, it is not necessary to provide N CCUs 300 with respect to N video sources. Furthermore, selection of a source from a camera using a live video switcher and selection of a packet using an IP switch have the same function in terms of source selection.

For this reason, the present embodiment integrally controls the functions and bodies of the live video switcher and the IP switch, thereby constructing a system with a simple configuration. In detail, in the present embodiment, a process is performed in units of video frame as with the live video switcher, a function equivalent to that of an apparatus for performing a process within less than a video frame time is integrally controlled using the IP switch, and a video frame is detected to switch an IP packet. Since such control is performed based on a general purpose IP switch, it is possible to flexibly construct a system at a low cost.

In the present embodiment, a function equivalent to that of the live video switcher used in a broadcasting station and the like may be performed for data such as an IP-packetized and transmitted video. That is, in response to the input of a video switching signal of the live video switcher, a video signal is output from the head of the next frame in a switcher. Thus, when a signal is encoded and compressed in IP packetization, a codec with no frame delay, for example, a line-based codec of JPEG 2000, a line-based codec with low delay, or a codec in units of slice is performed. Furthermore, a codec for performing a low delay process in units of macro block of MPEG 2 or H.264/AVC is used. By using the codec, encoding and decoding processes of one frame or less are possible.

(2) System Configuration Example

Figure 2:
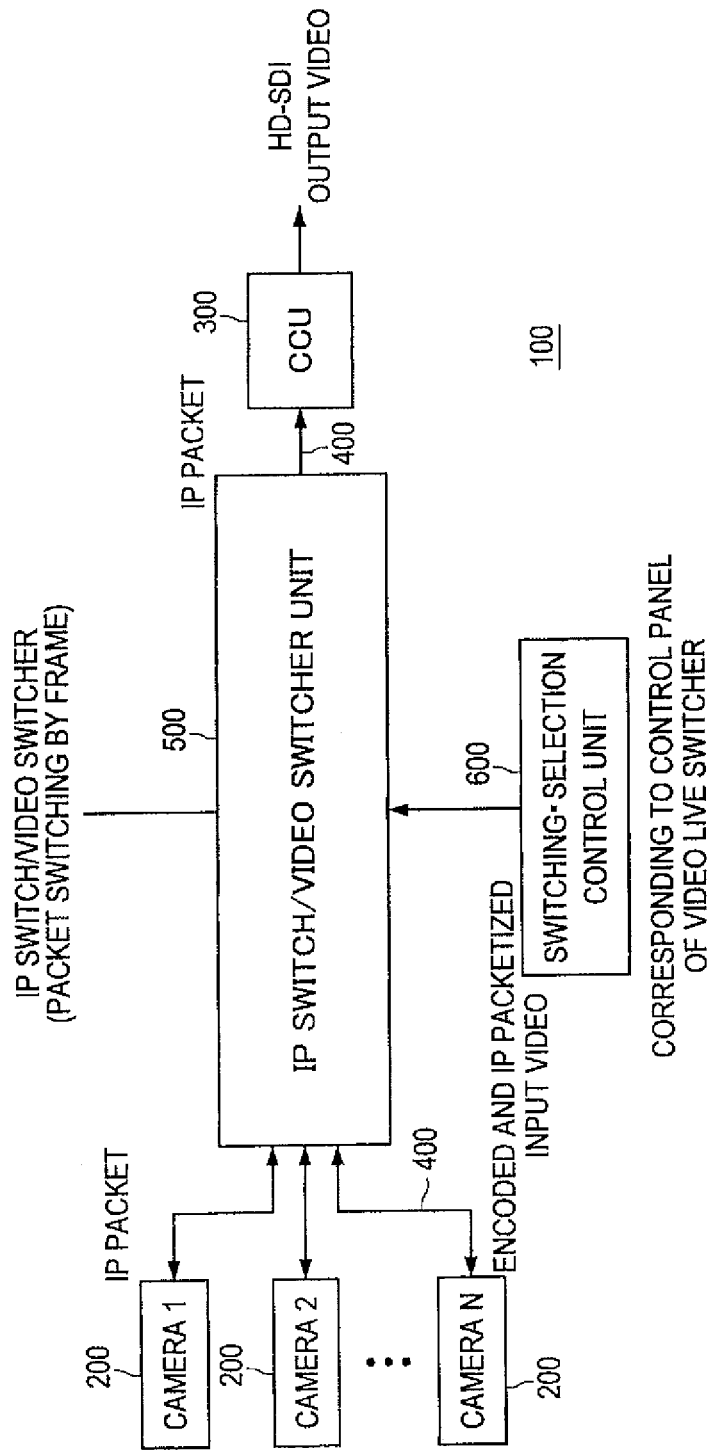
FIG. 2 is a schematic diagram showing a configuration of a system according to a first embodiment.

Hereinafter, the first embodiment will be described. FIG. 2 is a schematic diagram showing a configuration of a system according to the first embodiment. The present embodiment shows a basic configuration of each embodiment to be described below. As shown in FIG. 2, the present system includes a plurality of cameras (CHUs) 200 (1 to N), a CCU 300, a relay apparatus 500, and a switching/selection control unit 600. Each camera 200 is connected to the relay apparatus 500 through an asynchronous transmission network, and the relay apparatus 500 is connected to the CCU 300 through the asynchronous transmission network. The Ethernet (registered trademark) may be exemplified as the asynchronous transmission network. However, the present disclosure is not limited thereto.

Each camera 200 converts a video into an IP packet and outputs the IP packet. Video data may be non-compressed data or encoded data, and is packetized into an IP packet conforming to an Internet protocol. Furthermore, the camera 200 may packetize a reversibly compressed video signal according to a video encoding method. The IP switch/video switcher 500 includes an IP switch section 504 and a switch control section 506, and selects an IP packet, which is to be input to the CCU 300 of the rear stage, from the cameras 1 to N (200), and outputs the IP packet according to an instruction from the switching/selection control unit 600. The output IP packet is rearranged by the CCU 300 and converted into an HD-SDI signal to be output.

The switching/selection control unit 600 shown in FIG. 2 corresponds to a control panel of the video live switcher and receives an instruction for selecting or switching a camera video which is output as a video of broadcasting and the like.

Figure 3:
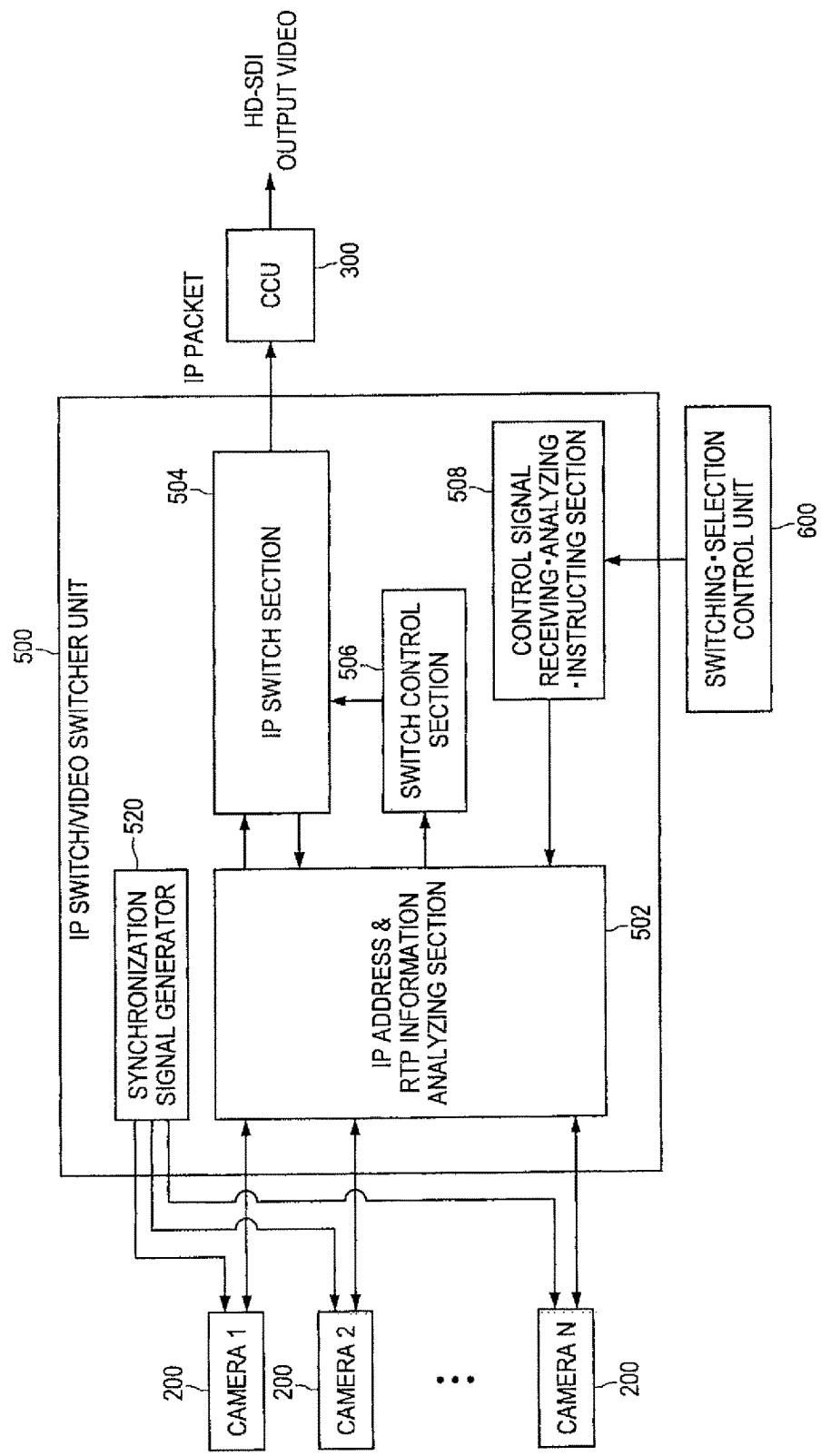
FIG. 3 is a detailed block diagram showing the configuration of the first embodiment.

FIG. 3 is a detailed block diagram showing the configuration of the first embodiment, and shows a detailed configuration of the relay apparatus 500. As shown in FIG. 3, the relay apparatus 500 includes an analyzing section 502 for analyzing an IP address and RTP information, an IP switch section 504, a switch control section 506, and a control signal receiving/analyzing/instructing section 508.

The control signal receiving/analyzing/instructing section 508 receives a signal from the switching/selection control unit 600, analyzes received data, and outputs an instruction for switching/selecting the camera 200 to the analyzing section 502. The analyzing section 502 determines the transmission destination of input data from the camera 200 based on an IP header and the like of the input data, and analyzes whether the input data corresponds to the switching/selecting instruction. The analyzing section 502 outputs an analysis result to the switch control section 506. The switch control section 506 converts the input analysis result into a control signal for controlling the IP switch section 504 and outputs the control signal to the IP switch section 504. Furthermore, IP packet data from each camera 200 is transmitted from the analyzing section 502 to the IP switch section 504. The IP switch section 504 switches or selects an input packet based on a new destination registered in a switching table according to the control signal which is input from the switch control section 506.

The IP switch section 504 has a plurality of ports and video signals corresponding to each CHU 200, which are input from the analyzing section 502, are input to the ports. Furthermore, one port is connected to an output line of the CCU 300. If IP packets are input to the ports to which the video signals corresponding to each CHU 200 are input, the IP switch section 504 connects a port of a transmission destination, which coincides with a destination registered in the switching table as a new destination, to a port connected to the output line of the CCU 300. In this way, the IP switch section 504 can transmit one video of the plurality of CHUs 200 to the CCU 300 based on the destination registered in the switching table. Furthermore, the IP switch section 504 selects a video signal by considering a delay amount until a video signal is actually switched after the signal is received from the switching/selection control unit 600, and smoothly performs video switching in units of frame.

As described above, when an IP packet of a live video is transmitted from each camera 200 to the relay apparatus 500, each camera 200, which includes an encoder, encodes video data using the encoder, packetizes resultant data and transmits a packet to the relay apparatus 500.

The switching/selection control unit 600 receives operation input for instructing the selection of a desired video of the camera 200 from a user, and transmits a control signal for selecting the video to the relay apparatus 500. The control signal receiving/analyzing/instructing section 508 analyzes the control signal and outputs an instruction to the analyzing section 502 to switch and select the camera 200.

If the analysis result of the control signal is received, the analyzing section 502 detects an IP address of the camera 200 desired by the user, which is included in the analysis result, and outputs the IP address to the switch control section 506. The switch control section 506 converts the received signal to a control signal for controlling the IP switch section 504 and outputs the control signal to the IP switch section 504. The IP switch section 504 switches and selects an input packet based on the IP address desired by the user and outputs an IP packet of the video desired by the user to the CCU 300 according to the control signal.

Furthermore, when video transmission is performed using the asynchronous transmission network, a difference occurs in the transmission paths according to the combinations of the CHUs 200 and the relay apparatus 500, resulting in a difference in a delay amount. For this reason, the relay apparatus 500 transmits a reference signal from a synchronization signal generator 520 to the CHUs 200, and the CHUs 200 transmit a video signal synchronized with the reference signal to the relay apparatus 500. In addition, the synchronization signal generator 520 may be provided separately from the relay apparatus 500. Meanwhile, although the video signal is allowed to be synchronized with the reference signal, since a difference occurs in the transmission paths according to the combinations of the CHUs 200 and the relay apparatus 500, it is assumed that a difference occurs in delay amounts of the CHUs 200. For this reason, delay amounts between the CHUs 200 and the relay apparatus 500 are acquired by the analyzing section 502. The analyzing section 502 adjusts the delay amounts to decide an optimal delay amount. The decided delay amount is notified to the CHUs 200, and the CHUs 200 appropriately set video buffers to adjust the timing of a video signal to arrive at the relay apparatus 500. As a specific method for deciding a delay amount, there is a method of adjusting the video buffer to allow a delay amount of a CHU 200 with the largest delay to be equal to delay amounts of other CHUs 200. In addition, the setting of the video buffer may be performed by the relay apparatus 500. By allowing the delay amounts to be equal to each other, distortion of a video in video switching can be reliably prevented.

If the IP packet is received from the IP switch section 504 of the relay apparatus 500, the CCU 300 decodes the IP packet and outputs a decoded packet as an HD-SDI video signal and the like.

When switching the videos of the cameras 200, the IP switch section 504 identifies a video frame, and switches an IP packet including head data constituting the video frame. Hereinafter, a method for identifying a video frame will be described.

Figure 4:
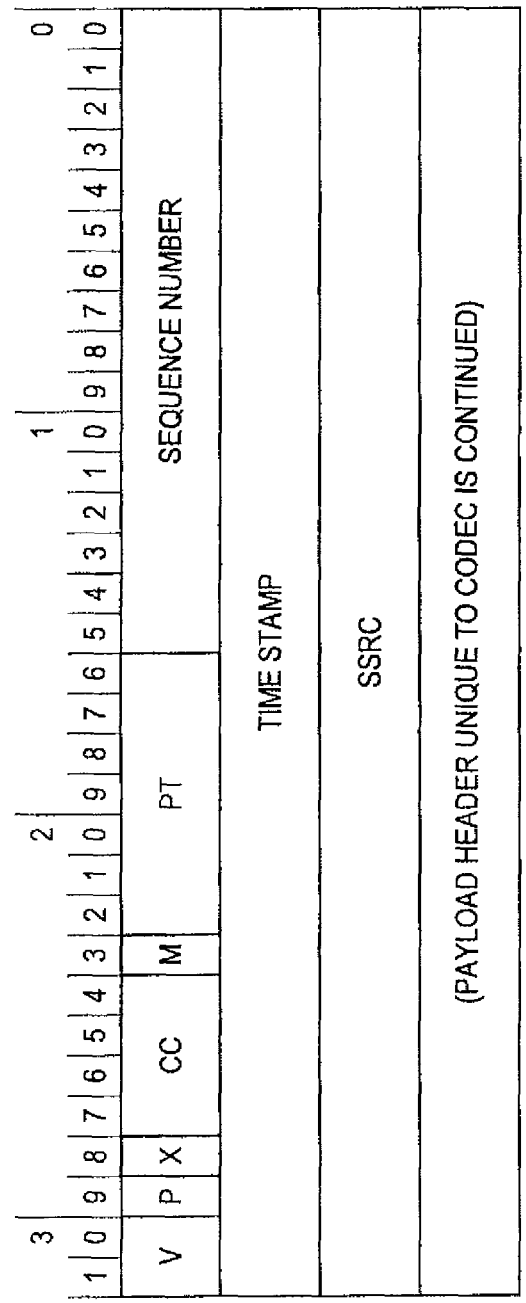
FIG. 4 is a schematic diagram showing a configuration of a header in an RTP format, which is used when transmitting data obtained by encoding a video.

FIG. 4 is a schematic diagram showing a configuration of a header in a real-time transfer protocol (RTP) format, which is used when transmitting data obtained by encoding a video. Information on the header is commonly defined regardless of an encoding scheme to be stored. FIG. 5 is a schematic diagram showing parameter information of the RTP format shown in FIG. 4. In order to identify a video frame, a marker bit, which is abbreviated as "M" in FIG. 5, is used. Usually, as the marker bit of "M" shown in FIG. 5, "1" is established in a packet including final data of a video frame. Thus, when the marker bit "M" detected by the IP switch section 504 has a value of "0," a packet from the same IP address is the head of the next video frame. Furthermore, when the "M" has a value of "1," it is possible to identify that the packet from the same IP address ends.

(3) Procedure of Switch Control

Figure 6:
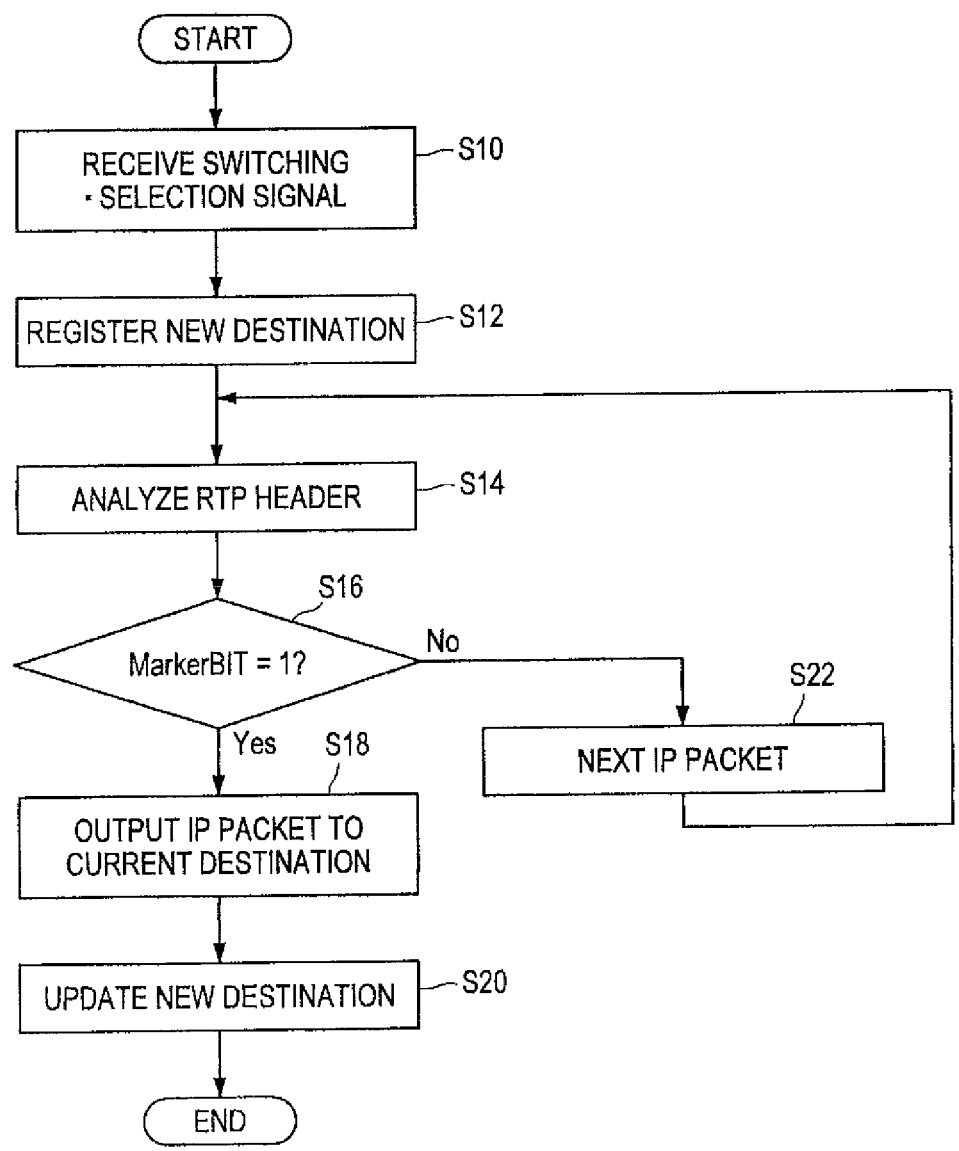
FIG. 6 is a flowchart showing a process flow of switch control in which an IP switch section performs video switching.

FIG. 6 is a flowchart showing a process flow of switch control in which the IP switch section 504 performs video switching. First, in step S10, a switching/selection signal corresponding to user's input is received from the switching/selection control unit 600. After the switching/selection signal is received, in step S12, a new destination (an IP address) is registered in a switching table of the IP switch section 504. However, until switch-based switching control is actually performed (until step S20 is reached), an IP packet is not switched to the new destination. In step S14, an RIP header is analyzed, and an RTP packet header in a payload of the IP packet having an IP address corresponding to the user's input is analyzed.

In step S16, it is determined whether a marker bit "M" of the RTP packet header has a value of "1." If the marker bit "M" has a value of "1," step S18 is performed so that the analyzed IP packet is output to the current destination. Then, step S20 is performed so that switch-based switching control is performed and the switching table is changed based on the new destination. In this way, the next IP packet is switched to a packet with the new destination. Meanwhile, if the marker bit "M" does not have a value of "1" in step S16, step S22 is performed so that analysis of an RTP header is performed with respect to the next IP packet in the same manner as in step S14. By the above-described control, it is possible to perform switching from the head of the next video frame.

Figure 7:
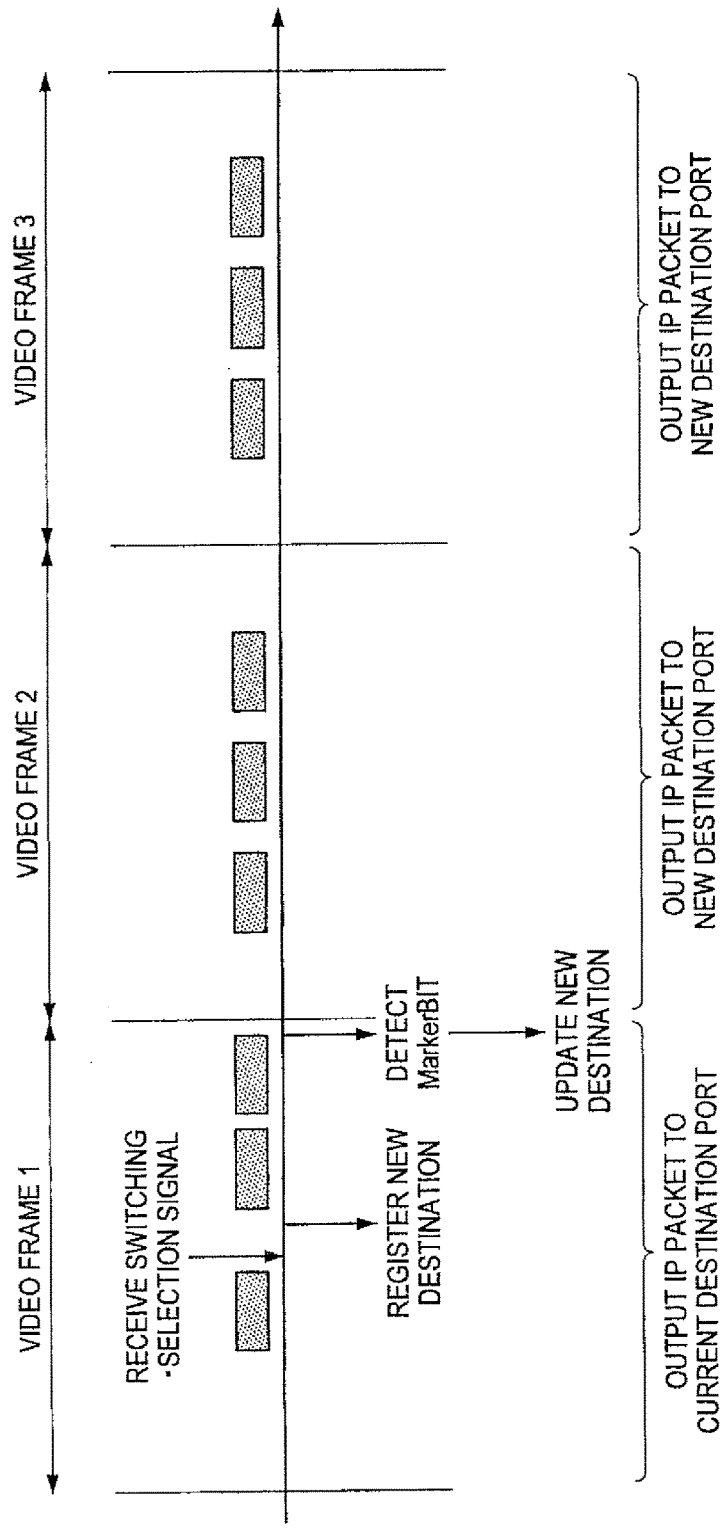
FIG. 7 is a schematic diagram for explaining signal switching in the control of FIG. 6.

FIG. 7 is a schematic diagram for explaining signal switching in the control of FIG. 6. It is assumed that there are video frames #1, #2 and #3 and each video frame is packetized into an IP packet and input to the relay apparatus 500.

FIG. 7 is explained based on the N number of CHUs and N number of CCUs system. A switching table represents N inputs from CHUs and corresponding N outputs to CCUs, as shown in Table 1 below. FIG. 7 shows example of switching the destination port by changing the destination address, but embodiments are not limited to this example. The source address in the switching table can be changed so that the source port could be switched, as shown in Table 1 and 3 below. Also the destination address in the switching table can be changed so that the source port could be switched, as shown in Table 1 and 2 below. (In this latter embodiment, the destination addresses of CAM1 and CAM2 signals can be changed so that the source ports of CAM1 and CAM2 could be switched, because this table just indicates relationship between input and output. Thus, changing the destination address in the table is equivalent to changing the corresponding source address, which means switching the source port.). These two additional embodiments are applicable for the system having N number of CHUs and one CCU, as shown in FIG. 2 and Table 4 below.

TABLE 1

Example switching table

| Source port (CHU) | Source address | Destination address | Destination port (CCU) |
| --- | --- | --- | --- |
| CAM1 | Xxx | Aaa | CCU-A |
| CAM2 | Yyy | Bbb | CCU-B |
| CAM3 | Zzz | Ccc | CCU-C |

TABLE 2

Switching destination address

| Source port (CHU) | Source address | Destination address | Destination port (CCU) |
| --- | --- | --- | --- |
| CAM1 | Xxx | Bbb | CCU-B |
| CAM2 | Yyy | Aaa | CCU-A |
| CAM3 | Zzz | Ccc | CCU-C |

TABLE 3

Switching source address

| Source port (CHU) | Source address | Destination address | Destination port (CCU) |
| --- | --- | --- | --- |
| CAM2 | Yyy | Aaa | CCU-A |
| CAM1 | Xxx | Bbb | CCU-B |
| CAM3 | Zzz | Ccc | CCU-C |

TABLE 4

Example switching table assuming N number of CHU and one CCU system

| Source port (CHU) | Source address | Destination address | Destination port (CCU) |
| --- | --- | --- | --- |
| CAM1 | Xxx | Aaa | CCU-A |
| CAM2 | Yyy | — | — |
| CAM3 | Zzz | — | — |

As described above, if the switching/selection signal is received in step S10, the new destination is registered in the switching table of the IP switch section 504. As shown in FIG. 7, the change to the new destination is performed (step S20) after the marker bit "M" is detected, and a routing table of a switch is switched. At the time at which the table is switched, the IP packet is output to the new destination port. By such control, it is possible to perform a switching process in units of video frame, which is equivalent to that of the conventional live video switcher, using the function of the IP switch.

Figure 8:
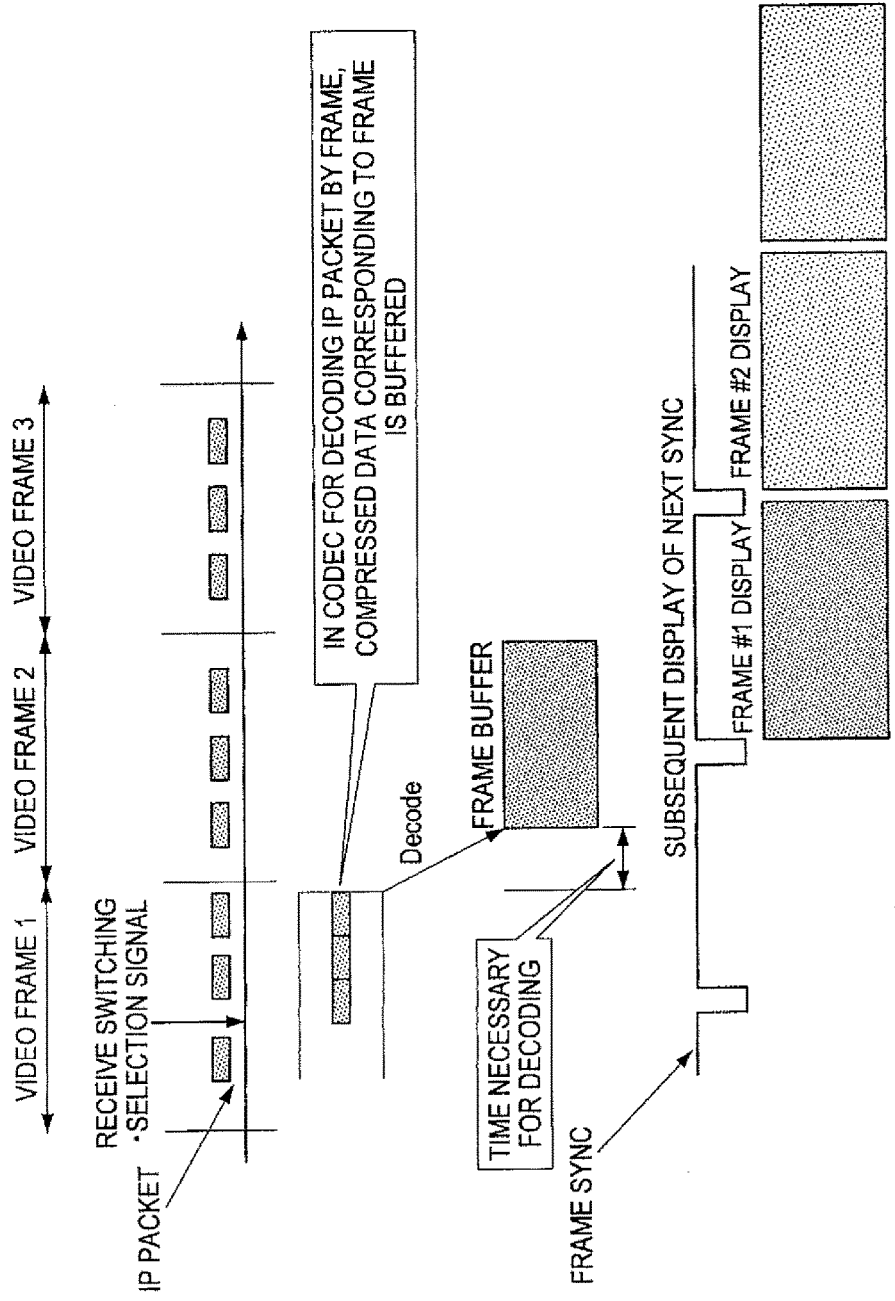
FIG. 8 is a schematic diagram showing a case where a decoding process is performed by the video frame.

Meanwhile, FIG. 8 shows a case where a decoding process is performed in units of video frame. When the decoding process is performed in units of video frame, since the decoding process is performed after all pieces of data of frame 1 of a video are buffered, a predetermined time is necessary until data of the frame 1 is received to the end after a control signal for switching a video is received, and the data of the frame 1 is further decoded and buffered. For this reason, as shown in FIG. 8, when the switching/selection signal has been received in the middle of the video frame #1, after passing the predetermined time necessary for receiving data of the video frame #1 to the end and further decoding the data, the frame #1 can be displayed at the timing of the next frame sync for the first time. Meanwhile, in FIG. 7, after changing the destination, it is possible to display a video after the switching from the video frame #2. For this reason, in the case of FIG. 8, a significant delay may occur in the switching of a video as compared with the case of FIG. 7. In the present embodiment, since encoding and decoding processes are performed in units of blocks of a plurality of lines as shown in FIG. 4, after a control signal for switching a video is received, it is possible to directly switch a video from the next frame.

Furthermore, in the system of the present embodiment, the switching/selection control unit 600 may be configured to decide a video channel to be switched/selected using the relay apparatus 500 (the IP switch) in consideration of the maximum number of videos necessary for synchronous output. In this way, it is possible to control a video by performing a decoding process using only a necessary CCU 300.

In addition, in the present embodiment, the selection of a video frame has been exemplified. However, audio data may be selected. For example, in the case of a system which reproduces audio synchronized in units of frame of a video frame, the relay apparatus 500 can detect a packet including the head of an audio frame similarly to a video, and switch an IP packet by the delimiter of the audio frame.

According to the first embodiment as described above, if there are functions corresponding to a video live switcher or CCUs with the number necessary for an effect process, it is not necessary to provide N CCUs with respect to the sources of N cameras. Furthermore, since a function of selecting a source from a camera by a live video switcher is equivalent to a function of selecting a packet by an IP switch in terms of source selection, the functions and the bodies of the live video switcher and the IP switch are integrally controlled, thereby constructing a system with a simple configuration. Consequently, according to the present embodiment, a video frame is detected to switch an IP packet, so that it is possible to integrally control a function, which is equivalent to that of an apparatus for performing a process in units of video frame and within less than a video frame time as with the live video switcher, using the IP switch. Since such control is performed based on a general purpose IP switch, it is possible to flexibly construct a system at a low cost.

For example, a minimum number of sources may be input as the input of a video live switcher, and the number of the CCUs 300 can be reduced, thereby achieving a system with a simple configuration in which the number of wirings is small. Consequently, the relay apparatus 500 is allowed to have a switching function, so that a simple configuration can be achieved, differently from the conventional camera system in which it is necessary to provide N CCUs that are the same in number as a plurality of N cameras and all outputs of the CCUs are input to a video live switcher of a rear stage.

Furthermore, it is possible to switch a packet, which is transmitted using an Ethernet (registered trademark) cable, using a general purpose switch, thereby constructing a system with a low cost and high affinity with a PC and the like, in which system modification including expansion and the like and integration with other IP devices are facilitated. For example, a synchronization signal, a control command, sound, income, a tary video, a return video and the like to a camera are multiplexed to the same cable through an IP packet, so that a simple configuration can be achieved.

2. Second Embodiment (1) System Configuration Example

Figure 9:
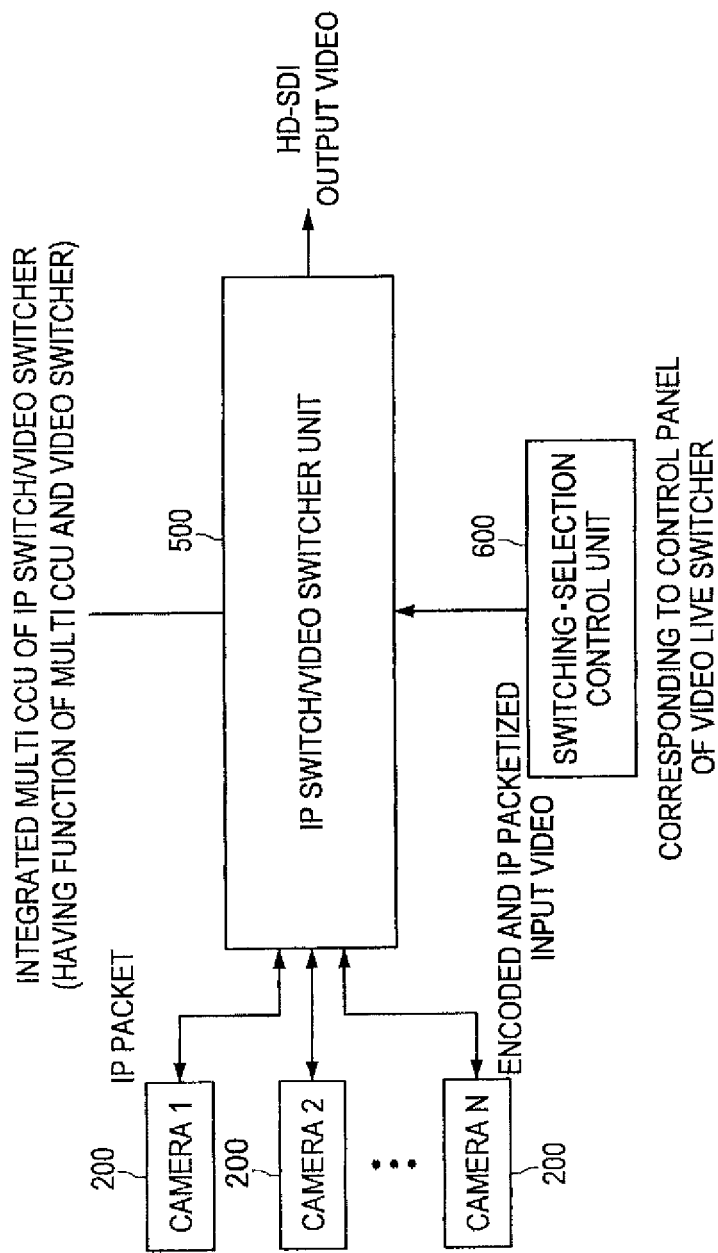
FIG. 9 is a schematic diagram showing a configuration of a system according to a second embodiment.

Next, the second embodiment of the present disclosure will be described. FIG. 9 is a schematic diagram showing a configuration of a system according to the second embodiment. The second embodiment may be applied to a case where a visual effect such as fade-in or fade-out occurs when switching a video. In the first embodiment, the CCU 300 performs a process at the rear stage of the relay apparatus 500. However, the second embodiment uses a system obtained by integrating the CCU 300 into the relay apparatus 500 (an IP switch/switcher). Thus, as the output of the relay apparatus 500, an HD-SDI video and the like are output.

Figure 10:
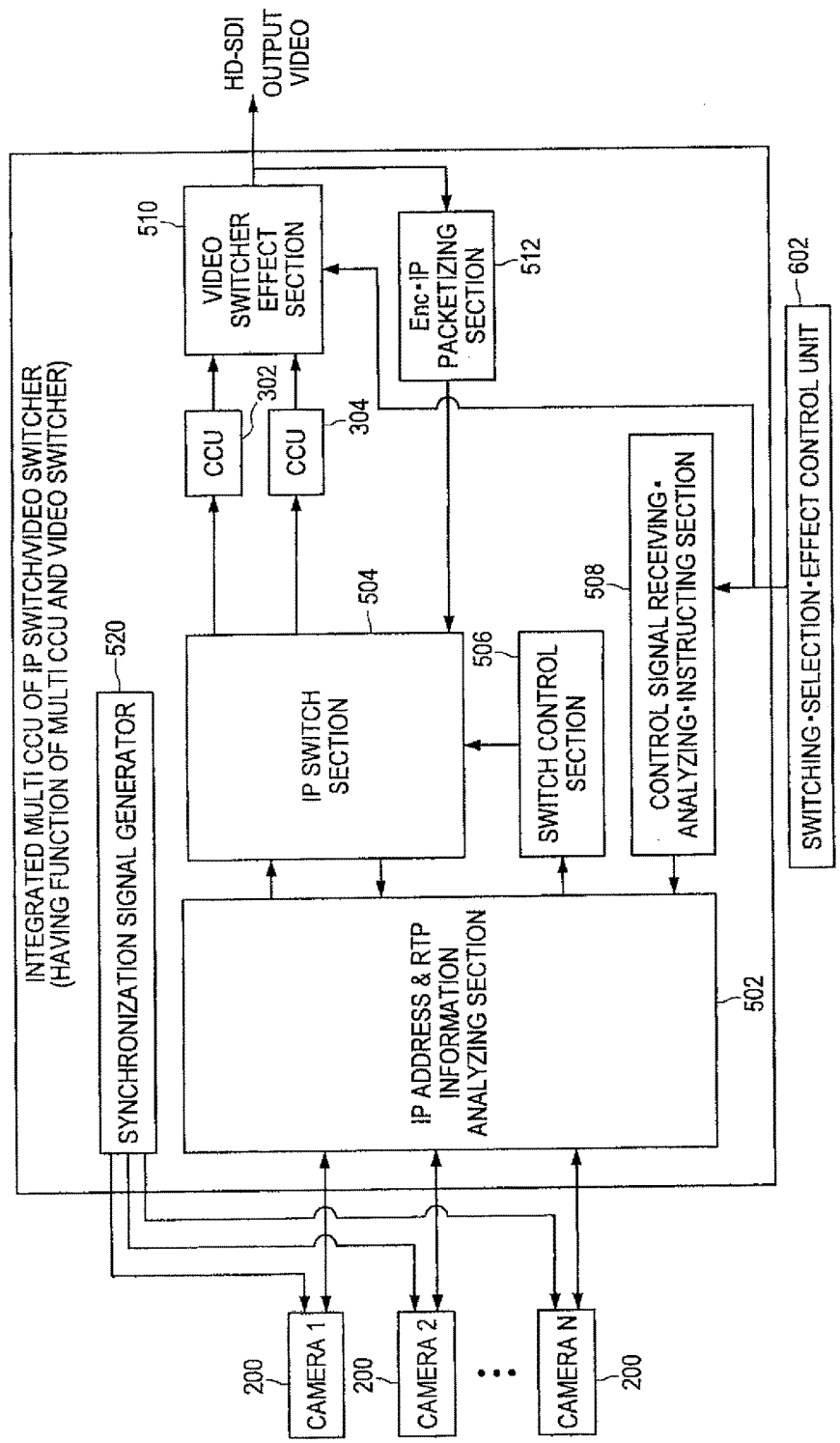
FIG. 10 is a schematic diagram showing a configuration of a relay apparatus according to the second embodiment.

FIG. 10 is a schematic diagram showing a configuration of the relay apparatus 500 according to the second embodiment. As shown in FIG. 10, the configuration of the second embodiment further includes CCUs 302 and 304, a video switcher effect section 510, and an encoding/IP packetizing section 512, in addition to the configuration of the relay apparatus 500 according to the first embodiment. Furthermore, the second embodiment includes a switching/selection/effect control unit 602, instead of the switching/selection control unit 600 according to the first embodiment.

Switch control by the IP switch section 504 is performed in the same manner as in the first embodiment. In the second embodiment, video signals with two destinations before and after video switching are input to the CCU 302 and the CCU 304, respectively. Then, output data decoded by the CCU 302 and the CCU 304 is subjected to an effect process in the video switcher effect section 510.

The video switcher effect section 510 has an effect function such as wiping/mixing and performs a process based on instructions from the switching/selection/effect control unit 602. When a user desires an effect in video switching, the user inputs the desire to the switching/selection/effect control unit 602. For example, when performing wiping/mixing with respect to a video A output from the CCU 302 and a video B output from the CCU 304, the video switcher effect section 510 performs a process of synthesizing the video A with the video B based on the input of the user, which is input to the switching/selection/effect control unit 602. Since the processed video is output to a monitor provided to the cameras 200 (1 to N) as a return signal, the video is subjected to an encoding process and an IP packetizing process in the encoding/IP packetizing section 512 and input to the IP switch section 504. The processed video is returned from the IP switch section 504 to the CHUs 200 (1 to N) through the analyzing section 502, and displayed on monitors provided to each CHU 200.

As described above, in the present embodiment, the return signal is output to the CHUs 200 (1 to N) via the IP switch section 504, so that a function equivalent to that of the multi-CCU can be performed through IP transmission. In this way, operators of the CHUs 200 (1 to N) can view videos currently selected on the monitors provided to the cameras 200 and effects when the videos are switched.

According to the second embodiment as described above, the relay apparatus 500 is allowed to have an effect processing function, so that it is possible to simultaneously perform a switching process and an effect process with respect to a video.

3. Third Embodiment (1) System Configuration Example

Figure 11:
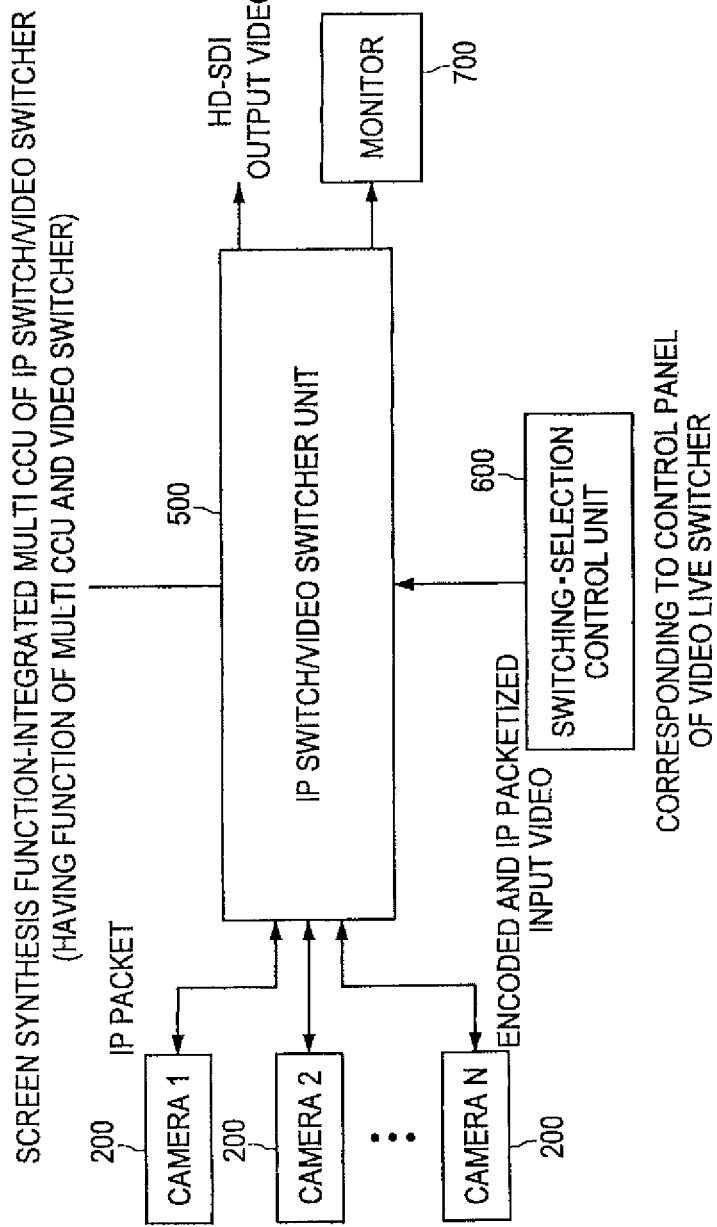
FIG. 11 is a schematic diagram showing a configuration of a relay apparatus according to a third embodiment.

Next, the third embodiment of the present disclosure will be described. FIG. 11 is a schematic diagram showing the configuration of the relay apparatus 500 according to the third embodiment. In the configuration shown in FIG. 11, a monitor 700 is connected to the relay apparatus 500, differently from the configuration shown in FIG. 9. In the third embodiment, a screen synthesis function is further provided differently from the configuration according to the second embodiment, and videos of the CHUs 200 (1 to N) can be monitored by one monitor 700.

Figure 12:
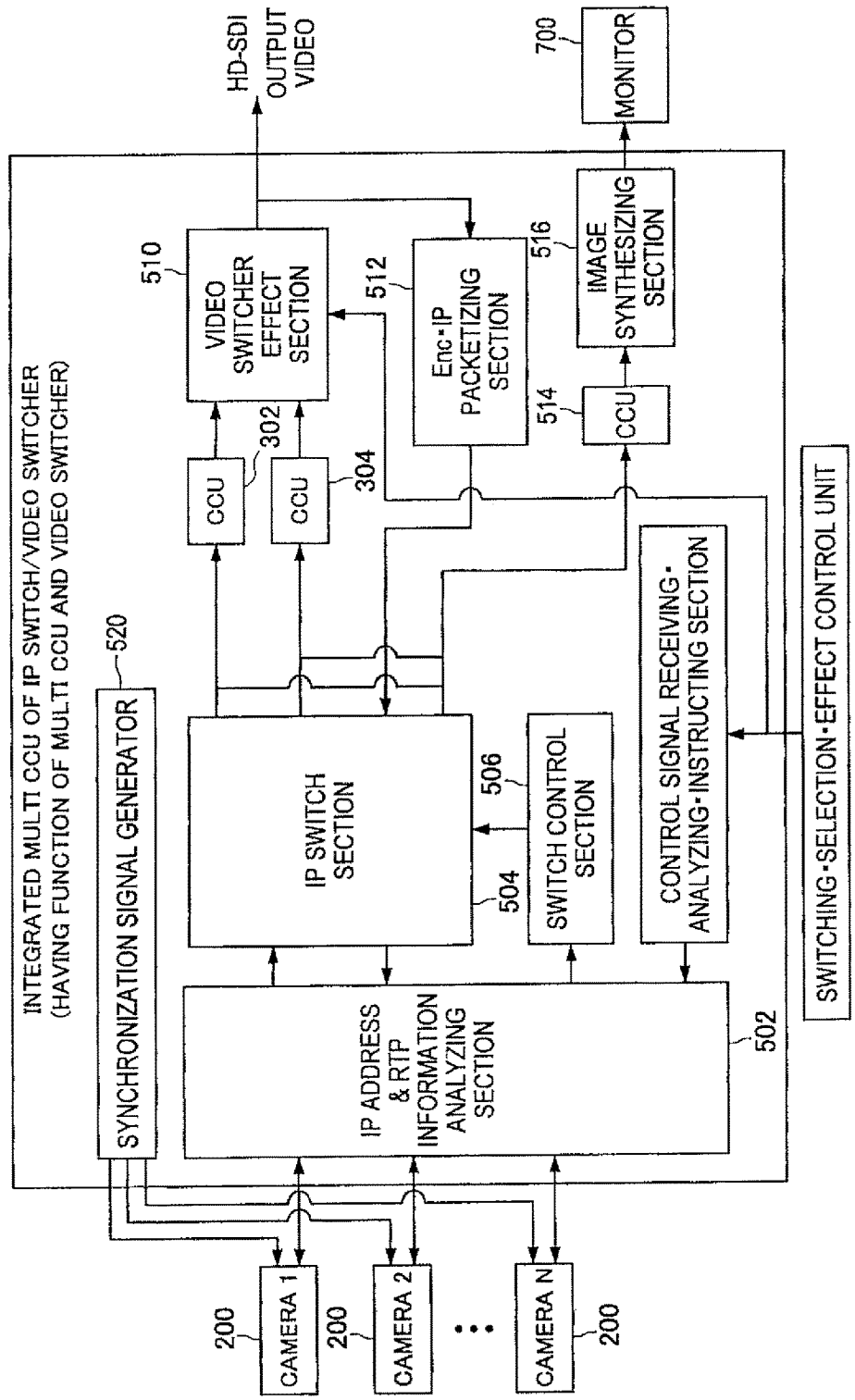
FIG. 12 is a schematic diagram showing the detailed configuration of the relay apparatus according to the third embodiment.

FIG. 12 is a schematic diagram showing the detailed configuration of the relay apparatus 500 according to the third embodiment. As shown in FIG. 12, the third embodiment further includes a CCU 514 for processing all camera videos and an image synthesizing section 516 for synthesizing images, in addition to the configuration according to the second embodiment shown in FIG. 10. Hereinafter, the CCU 514 is called a B type and the CCUs 302 and 304 connected to the IP switch section 504 are called an A type. The B-type CCU 514 has a function of decoding video data and may have a function equivalent to those of the A-type CCUs 302 and 304. Furthermore, since the B-type CCU 514 displays a synthesized image on the monitor 700, it may have a function (quality) for synthesizing a plurality of images, for example, may process a video with a low resolution or a video with a low frame rate. Alternatively, instead of the B-type CCU 514, a CPU may be provided to decode a video and output a decoded video to the image synthesizing section 516.

The CCU 514 decodes video data which is output from the IP switch section 504 and corresponds to all CHUs 200 (1 to N) and outputs decoded data to the image synthesizing section 516. The image synthesizing section 516 synthesizes the decoded data, which corresponds to all the CHUs 200 (1 to N), into one screen and output synthesized data to the external monitor 700. In this way, a user can view videos of all CHUs 200 (1 to N) with reference to the monitor 700. Then, the user selects a desired video from the videos displayed on the monitor 700 and allows the selected video to be input from the switching/selection/effect control unit 602, so that the desired video can be output from the video switcher effect section 510.

According to the third embodiment as described above, the CHU 200 is connected to the relay apparatus 500 having a video synthesis function for monitor display through an Ethernet (registered trademark) and the like for inexpensive IP transmission, thereby achieving a video switcher with a video frame level and a simple system capable of performing an effect function, which have not been achieved in the conventional IP switch.

While the preferred embodiments of the present invention have been described above with reference to the accompanying drawings, the present invention is not limited to the above examples. A person skilled in the art may find various alternations and modifications within the scope of the appended claims, and it should be understood that they will naturally come under the technical scope of the present invention.

The present application contains subject matter related to that disclosed in Japanese Priority Patent Application JP 2010-134111 filed in the Japan Patent Office on Jun. 11, 2010, the entire content of which is hereby incorporated by reference.

What is claimed is:

1. A camera system comprising:
a plurality of camera apparatuses to output respective video signals in the form of frames of packetized video data; and
a relay apparatus coupled to the plurality of camera apparatuses to relay to different destinations selected packetized video data received from the plurality of camera apparatuses,
wherein the relay apparatus comprises:
a receiving unit to receive the packetized video data from respective ones of the plurality of camera apparatuses and a destination address to which the received packetized video data is intended;
a control unit to determine if the selected packetized video data from a particular one of the plurality of camera apparatuses is to be switched to a particular destination based on the destination address; and
a switch unit to select and output to the destination address the selected packetized video data on a frame basis, the switch unit being responsive to a change destination instruction for changing a current destination to which the packetized video data is outputted, the change destination instruction being received prior to reception of a complete current frame of packetized video data, such that the switch unit continues to output to the current destination the packetized video data of the current frame until the end of the current frame is received and thereafter outputs the packetized video data to the changed destination.

2. The camera system of claim 1, wherein a video frame is comprised of a plurality of packets of video data, having a head packet, and
wherein the switch unit selects and outputs starting from a head packet of a next frame of the selected packetized video data.

3. The camera system of claim 2, wherein each packet of video data includes a marker bit that identifies a final packet of a video frame.

4. The camera system of claim 3, wherein the switch unit determines a head packet of the next frame of the selected packetized video data based on the marker bit.

5. A method of providing video images, comprising:
generating packetized video data from a plurality of camera apparatuses and outputting the packetized video data in the form of frames;
receiving the packetized video data at a relay apparatus;
determining if selected packetized video data from a particular one of the plurality of camera apparatuses is to be switched to a particular destination address determined by an input control signal that selects desired packetized video data and selects a desired destination address; and
selecting and outputting to the selected destination address selected packetized video data on a frame basis, such that if the control signal is input to change the selected destination from a current destination to which the packetized video data is output to a changed destination prior to reception of a complete current frame of packetized video data, packetized video data of the current frame is continued to be outputted to the current destination until the end of the current frame is received and thereafter the packetized video data is output to the changed destination.

6. The method of claim 5, wherein a video frame is comprised of a plurality of packets of video data, having a head packet, and wherein the selecting and outputting starts from a head packet of a next frame of the selected packetized video data.

7. The method of claim 6, wherein each packet of video data includes a marker bit that identifies a final packet of a video frame.

8. The method of claim 7, further comprising determining a head packet of the next frame of the selected packetized video data based on the marker bit.

9. A camera system comprising:
   a plurality of camera means for outputting respective video signals in the form of frames of packetized video data; and
   relay means coupled to the plurality of camera means for relaying different destinations selected packetized video data received from the plurality of camera means,
   wherein the relay means comprises:
   receiving means for receiving the packetized video data from respective ones of the plurality of camera means and a destination address to which the received packetized video data is intended;
   controlling means for determining if the selected packetized video data from a particular one of the plurality of camera means is to be switched to a particular destination based on the destination address; and
   switching means for selecting and outputting to the destination address the selected packetized video data on a frame basis, the switch unit being responsive to a change destination instruction for changing a current destination to which the packetized video data is outputted, the change destination instruction being received prior to reception of a complete current frame of packetized video data, such that the switch unit continues to output to the current destination the packetized video data of the current frame until the end of the current frame is received and thereafter outputs to the changed destination the packetized video data.

10. The camera system of claim 9, wherein a video frame is comprised of a plurality of packets of video data, having a head packet, and
    wherein the switch means selects and outputs starting from a head packet of a next frame of the selected packetized video data.

11. The camera system of claim 10, wherein each packet of video data includes a marker bit that identifies a final packet of a video frame.

12. The camera system of claim 11, wherein the switching means determines a head packet of the next frame of the selected packetized video data based on the marker bit.

* * * * *